(12) United States Patent
Christensen et al.

(10) Patent No.: US 11,757,100 B2
(45) Date of Patent: Sep. 12, 2023

(54) ION DEPOSITION BIASING TO INHIBIT DENDRITE FORMATION AND GROWTH IN A METAL ION BATTERY CELL

(71) Applicant: Robert Bosch GmbH, Stuttgart (DE)

(72) Inventors: John F. Christensen, Elk Grove, CA (US); Ram Subbaraman, Sunnyvale, CA (US)

(73) Assignee: Robert Bosch GmbH, Stuttgart (DE)

( * ) Notice: Subject to any disclaimer, the term of this patent is extended or adjusted under 35 U.S.C. 154(b) by 227 days.

(21) Appl. No.: 16/977,027

(22) PCT Filed: Feb. 20, 2019

(86) PCT No.: PCT/EP2019/054194
§ 371 (c)(1),
(2) Date: Aug. 31, 2020

(87) PCT Pub. No.: WO2019/170415
PCT Pub. Date: Sep. 12, 2019

(65) Prior Publication Data
US 2020/0411877 A1 Dec. 31, 2020

Related U.S. Application Data

(60) Provisional application No. 62/638,597, filed on Mar. 5, 2018.

(51) Int. Cl.
*H01M 4/62* (2006.01)
*H01M 4/04* (2006.01)
*H01M 4/134* (2010.01)
*H01M 4/1395* (2010.01)
*H01M 4/36* (2006.01)
(Continued)

(52) U.S. Cl.
CPC ......... *H01M 4/628* (2013.01); *H01M 4/0438* (2013.01); *H01M 4/134* (2013.01);
(Continued)

(58) Field of Classification Search
CPC .... H01M 4/628; H01M 4/0438; H01M 4/134; H01M 4/1395; H01M 4/366;
(Continued)

(56) References Cited

U.S. PATENT DOCUMENTS

2007/0259234 A1  11/2007  Chua et al.
2011/0104571 A1   5/2011  Zhamu et al.
(Continued)

FOREIGN PATENT DOCUMENTS

WO     2012/118840 A2    9/2012

OTHER PUBLICATIONS

International Search Report corresponding to PCT Application No. PCT/EP2019/054194, dated Apr. 30, 2019 (3 pages).
(Continued)

*Primary Examiner* — Stewart A Fraser
(74) *Attorney, Agent, or Firm* — Maginot, Moore & Beck LLP

(57) ABSTRACT

A battery cell includes a current collector, separator, anode, and deposition biasing element. The anode is positioned between the current collector and separator, and includes an ion conducting ceramic material with a porous structure. The biasing element is positioned within the battery cell so as to bias ion deposition within the anode, during a charging process, away from the separator. A method for forming a battery cell includes electrospinning particles of material into a mesh to form an anode that includes an ionically conductive material. At least one biasing element is applied to at least one of the anode and a current collector. The anode is positioned between the current collector and a separator. The current collector and the separator are joined to the anode.

13 Claims, 4 Drawing Sheets

(51) Int. Cl.
*H01M 4/66* (2006.01)
*H01M 4/80* (2006.01)
*H01M 10/0562* (2010.01)
*H01M 10/42* (2006.01)
*H01M 4/02* (2006.01)

(52) U.S. Cl.
CPC ......... *H01M 4/1395* (2013.01); *H01M 4/366* (2013.01); *H01M 4/668* (2013.01); *H01M 4/80* (2013.01); *H01M 10/0562* (2013.01); *H01M 10/4235* (2013.01); *H01M 2004/021* (2013.01); *H01M 2300/0068* (2013.01)

(58) Field of Classification Search
CPC .... H01M 4/668; H01M 4/80; H01M 10/0562; H01M 10/4235; H01M 2004/021; H01M 2300/0068; H01M 4/0404
See application file for complete search history.

(56) References Cited

U.S. PATENT DOCUMENTS

| | | | |
|---|---|---|---|
| 2012/0043940 A1* | 2/2012 | Affinito | H01M 4/628 429/231.95 |
| 2012/0282484 A1 | 11/2012 | Joo et al. | |
| 2014/0011088 A1* | 1/2014 | Lopatin | H01M 4/386 429/211 |
| 2015/0295274 A1 | 10/2015 | Engel et al. | |
| 2016/0293943 A1* | 10/2016 | Hu | H01M 10/052 |
| 2017/0214054 A1 | 7/2017 | Cui et al. | |

OTHER PUBLICATIONS

Liu, Y. et al., "Lithium-coated polymeric matrix as a minimum volume-change and dendrite-free lithium metal anode," Nature Communications, Mar. 18, 2016 (9 pages).

Kong, L. et al., "Review of nanostructured current collectors in lithium-sulfur batteries," Nano Research, 2017 (28 pages).

Wang, C. et al., "A Review on the Electrospun Oxide Nanofibers for Anode Electrodes in Lithium-Ion Batteries," Current Nanoscience, Bentham Science, vol. 13, pp. 394-409, 2017 (16 pages).

Jung, J-W et al., "Electrospun nanofibers as a platform for advanced secondary batteries: a comprehensive review," Journal of Materials Chemistry A, vol. 4, pp. 703-750, 2016 (48 pages).

Zhang et al., "Advanced Micro/Nanostructures for Lithium Metal Anodes," Advanced Science News, vol. 4, 2017 (13 pages).

* cited by examiner

# ION DEPOSITION BIASING TO INHIBIT DENDRITE FORMATION AND GROWTH IN A METAL ION BATTERY CELL

RELATED APPLICATIONS

This application is a 35 U.S.C. § 371 National Stage Application of PCT/EP2019/054194, filed on Feb. 20, 2019, which claims the benefit of priority to U.S. Provisional Patent Application No. 62/638,597, filed on Mar. 5, 2018, the disclosures of which are incorporated herein by reference in their entirety.

TECHNICAL FIELD

This disclosure relates generally to battery components and, more particularly, to anodes for metal ion battery cells.

BACKGROUND

Unless otherwise indicated herein, the materials described in this section are not prior art to the claims in this application and are not admitted to the prior art by inclusion in this section.

Li metal has several qualities that have motivated efforts to incorporate Li metal-based components into batteries. Li metal has a theoretical capacity of 3860 mAh/g, and thus offers the highest capacity of any known anode material for an Li-ion battery. As a result, batteries with lithium-metal or lithium-alloy anodes can have a higher specific energy than batteries with anodes formed from other materials. For instance, lithium/sulfur and lithium/air batteries have the potential to reach a specific energy of 500 to 1000 Wh/kg, or more. These desirable qualities, however, have several tradeoffs that impede the use of Li metal as an anode for a battery.

In particular, the longevity of a battery with a Li metal anode is generally limited due to the formation of electronically conducting dendritic structures. During charging, Li ions move from a cathode to the anode, and vice versa during discharge. Over successive charging/discharging cycles, Li ions have a tendency to build up in needle-like or moss-like structures, i.e. "dendrites," rather than being deposited evenly. Dendrites may form for various reasons, including discontinuities in the surface of the anode, impurities within the anode, and variation in a characteristic within the anode, such as current density ($mA/cm^2$), during a charging process. The buildup of Li ions into dendrites over successive cycles thus leeches Li metal material from the anode, and can lead to parasitic capacity loss in the battery. Further, in a worst-case scenario, a dendrite can continue to grow and form a short circuit between the anode and cathode of the battery. A short between battery electrodes can severely decrease the longevity of the battery, and is potentially dangerous.

In an effort to inhibit the growth of dendrites, batteries with Li metal anodes generally incorporate mechanically rigid electrolytes such as solid state polymeric materials, composite oxides, glasses, and other compounds. Such materials can act as a mechanical confiner that physically restrains dendrite growth. However, the capacity of mechanically rigid electrolytes to act as a mechanical confiner generally decreases in the presence of increased current density, e.g. for a current density >1 $mA/cm^2$. Current density increases with a faster charging rate, and thus such materials are ineffective as a dendrite growth inhibitor for battery applications where rapid charging is desirable.

Additional tradeoffs for the incorporation of an Li metal anode include (i) the tendency of Li metal to build up on surface defects on solid components, which can lead to accelerated failure modes in the presence of defects in a separator between the anode and cathode, (ii) the generally unrestricted growth of Li metal during Li ion deposition during charging, which results in in-homogeneities within the anode and reduced performance of the cell, and (iii) a change in the volume of an Li metal anode during charging and discharging of the battery, which can impact the longevity and structural integrity of the battery.

Therefore, battery components that have a high longevity, and that inhibit dendrite growth would be beneficial. Battery components that operate homogenously during charging and discharging would also be beneficial. Battery components that have limited or no volume change during charging and discharging would also be beneficial.

SUMMARY

In order to inhibit dendrite growth and/or formation, a battery cell includes a first current collector, a separator, an anode, and at least one deposition biasing element. The anode is positioned between the first current collector and the separator, and includes an ion conducting material with a porous structure. The at least one deposition biasing element is positioned within the battery cell so as to bias ion deposition within the anode, during a charging process for the battery cell, away from the separator.

In some embodiments, the ion conducting material is a Li-based ceramic material.

In some embodiments, the at least one deposition biasing element includes a seed layer. The seed layer has discrete concentrations of a metal material corresponding to ions conducted by the ion conducting material. The seed layer is positioned between the first current collector and the separator so as to be closer to the first current collector than to the separator, and is configured to bias ion deposition within the anode toward the first current collector.

In some embodiments, the battery cell is configured such that, in a fully discharged state, about 20% by weight of a total amount of the metal material corresponding to the ions conducted by the ion conducting material remains disposed within the seed layer.

In some embodiments, the at least one deposition biasing element includes a dendrite quenching layer. The dendrite quenching layer has a material configured to alloy with a metal material corresponding to ions conducted by the ion conducting material. The dendrite quenching layer is positioned in a region of an interface between the anode and the separator, and is configured to bias ion deposition within the anode away from the separator.

In some embodiments, the at least one deposition biasing element includes an electronically conductive coating coated onto a portion of the porous structure of the anode proximate to the first current collector. The electronically conducting coating is configured to bias ion deposition within the anode toward the first current collector and away from the separator.

In some embodiments, the anode includes a base formed by polymer material fibers. In some embodiments, the ion conducting material is a coating coated onto the polymer material fibers to form the porous structure.

In some embodiments, the anode has a porosity of about 60% to about 90%.

In order to inhibit dendrite growth and/or formation, a method for forming a battery cell includes electrospinning particles of material into a mesh to form an anode, the anode including an ionically conductive material. At least one deposition biasing element is applied to at least one of the anode and a first current collector. The anode is positioned between the first current collector and a separator so that the first current collector and a first side of the anode form a first interface, and so that a second side of the anode and the separator form a second interface. The first current collector and the separator are joined to the anode.

In some embodiments, applying the at least one deposition biasing element includes applying a seed layer between the first current collector and the separator so as to be closer to the first current collector than to the separator. The seed layer includes discrete concentrations of a metal material corresponding to ions conducted by the ionically conductive material, and is configured to bias ion deposition within the anode, during a charging process, toward the first current collector.

In some embodiments, applying the at least one deposition biasing element includes applying a dendrite quenching layer to the second side of the anode. The dendrite quenching layer has a material configured to alloy with a metal material corresponding to ions conducted by the ion conducting material. The dendrite quenching layer is configured to bias ion deposition within the anode, during a charging process, away from the separator.

In some embodiments, applying the at least one deposition biasing element includes applying an electronically conductive material coating to a portion of the anode proximate to the first side. A remainder of the anode is purely ionically conductive, such that ion deposition within the anode during a charging process is biased toward the first current collector and away from the separator.

In some embodiments, the method further includes joining a cathode and a second current collector to a side of the separator opposite the anode, such that the cathode is positioned between the separator and the second current collector.

In some embodiments, the anode, separator, and cathode are solid state, such that the battery cell is a solid state battery cell.

In some embodiments, the ionically conductive material is a Li-based ceramic material.

BRIEF DESCRIPTION OF THE DRAWINGS

FIG. 2b depicts a charging system for charging the battery cell of FIG. 2a.

DETAILED DESCRIPTION

For the purposes of promoting an understanding of the principles of the disclosure, reference is now made to the drawings and descriptions in the following written specification. No limitation to the scope of the subject matter is intended by the references. This disclosure also includes any alterations and modifications to the illustrated embodiments and includes further applications of the principles of the described embodiments as would normally occur to one skilled in the art to which this document pertains.

Introduced herein are techniques for inhibiting dendrite formation and growth within a battery cell. During charging of the battery cell, a deposition biasing element biases the deposition of Li ions toward a current collector and/or away from an interface between an anode and a separator. Such biasing inhibits the formation and growth of dendrites within the anode, and increases the longevity of the battery cell over multiple charging/discharging cycles.

Also introduced herein are techniques for decreasing volume change for the battery during charging and discharging, and promoting homogeneous operation of battery components. In various embodiments, an anode has a porous framework structure. During charging, Li ions are deposited within the porous structure, rather than solely on a surface of the anode at an interface between the anode and the separator. Such deposition results in more homogenous distribution of Li ions within the anode during charging, reduces a volume change experienced by the anode, and increases an effective surface area of the anode.

Figure 1:
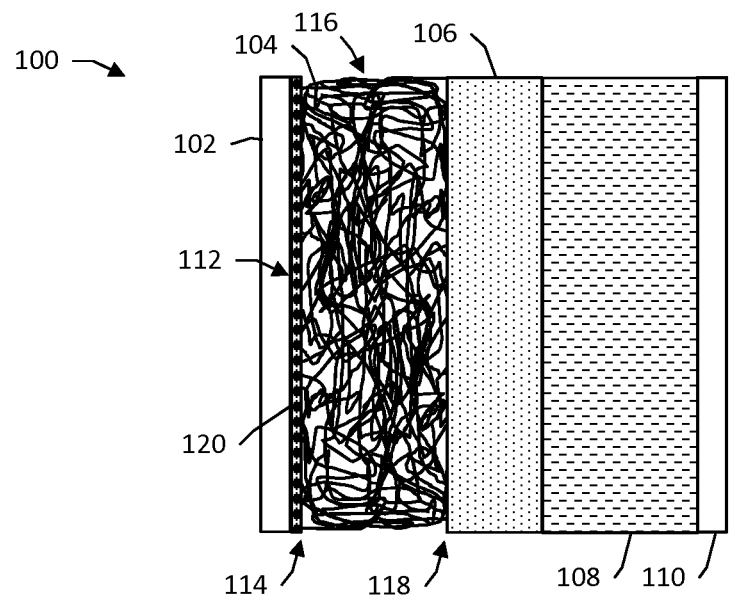
FIG. 1 depicts an exemplary embodiment of a battery cell according to this disclosure.

FIG. 1 depicts an exemplary embodiment of a metal-ion metal battery cell 100 according to this disclosure. In some embodiments, the battery cell 100 is a Li ion battery cell. The battery cell 100 includes a first current collector 102, an anode 104, a separator 106, a cathode 108, a second current collector 110, and a deposition biasing element 112. The separator 106 is positioned between the anode 104 and the cathode 108. The anode 104 is positioned between the first current collector 102 and the separator 106. The cathode 108 is positioned between the separator 106 and the second current collector 110. In some embodiments, the deposition biasing element 112 is positioned between the first current collector 102 and the separator 106 so as to be closer to the first current collector 102 than to the separator 106. In some embodiments, the deposition biasing element 112 is positioned at a first interface 114 between the first current collector 102 and the anode 104.

As used herein, a "charging process" refers to a process of storing electrical energy in a battery cell. For example, when a positive voltage is applied between the second current collector 110 and the first current collector 102 of the battery cell 100, metal ions migrate from the cathode 108, through the separator 106, and are deposited within the anode 104. The metal ions stored within the anode 104 correspond to a stored energy capacity of the battery cell 100.

As used herein, a "discharging process" refers to a process of removing stored electrical energy from a battery cell. For example, when a load is connected between the first current collector 102 and the second current collector 110 of the battery cell 100, metal ions migrate from the anode 104, through the separator 106, and are deposited into the cathode 108. The release of metal ions from the anode 104 forms a flow of free electrons that are collected by the first current collector 102, resulting in a positive current from the second current collector 110, through the load, to the first current collector 102.

The first current collector 102 is a substrate that includes any acceptable electrically conductive material such as, for example, copper, nickel, steel, or titanium. In some embodiments, the first current collector 102 is a thin sheet, but other types of current collectors are used in other embodiments, such as meshes, plates, etc. In some embodiments, the first current collector 102 is a monopolar current collector. In some embodiments, the first current collector 102 is a bipolar current collector, i.e. a surface of the first current collector 102 facing away from the anode 104 is a second current collector of a further battery cell.

The anode 104 is a solid state metal-based anode with a porous structure 116. It should be understood that as used herein "porous" refers to the void fraction of the material of the anode (e.g. voids between regions of material), and not to a capacity of such material to receive ions (e.g. voids between molecules of the material). The porous structure 116 acts as a host for the deposition of metal ions during the charging process for the battery cell 100. Specifically, the porous structure 116 increases the effective surface area of the anode 104.

In other words, the internal surfaces of the porous structure 116 are exposed to metal ions received by the anode 104 from the separator 106, rather than merely a surface of the anode 104 at a second interface 118 between the anode 104 and the separator 106. As a result, the deposition of metal ions is more evenly distributed throughout the anode 104 relative to conventional anodes. A more even distribution of metal ion deposition within the anode results in a more even current density within the anode, and can have an inhibiting effect on dendrite formation and growth.

Further, due to the porous structure 116, the current within the anode 104 during the charging process is distributed over the larger surface area. As a result, a magnitude of the current density within the anode 104 is decreased relative to conventional anodes, enabling an increase in charging rate for the battery cell 100. Additionally, since metal ions are deposited within the porous structure 116 of the anode 104, rather than merely at the second interface 118, the deposited metal ions tend to internally fill the porous structure 116 instead of building up externally at the second interface 118 and increasing the volume of the anode 104. As a result, the anode 104 exhibits a decreased change in volume during the charging and discharging processes relative to conventional anodes.

In some embodiments, the porous structure 116 of the anode 104 has a porosity of about 60% to about 90%. In some embodiments, the anode 104, in an uncharged state, has a thickness of about 10 micrometers to about 100 micrometers. Other porosities and thicknesses are used in other embodiments. In some embodiments, the porous structure 116 of the anode 104 is formed from electrospun fibers formed into a wool-like mesh. In embodiments in which the battery cell 100 is a Li ion battery cell, the fibers include a Li ion conducting ceramic ("LIC") material. Any acceptable LIC material is usable, including (i) an oxide type material such as $Li_7La_3Zr_2O_{12}$ (LLZO), or $Li_{3x}La_{2/3-x}TiO_3$ (LLTO), (ii) an oxyphosphate type material such as $Li_{1.5}Al_{0.5}Ge_{1.5}P_3O_{12}$ (LAGP), (iii) a sulfide material such as $Li_3PS_4$ (LPS) or $Li_{10}GeP_2S_{12}$ (LGPS), (iv) a glassy formulation of one of the forgoing, or (v) combinations thereof. As discussed in more detail below, in some embodiments, at least a portion of the fibers further include a polymer material and/or an electrically conductive material.

As used herein, a "deposition biasing element" is an element that has at least one of a physical, chemical, and structural property that affects the deposition of metal ions in a region of the element during the charging process. In some embodiments, a deposition biasing element biases the deposition of metal ions toward the region of the deposition biasing element. In some embodiments, a deposition biasing element biases the deposition of metal ions away from the region of the deposition biasing element.

In some embodiments, the deposition biasing element 112 includes a seed layer 120. As used herein, a "seed layer" is a layer that includes discrete concentrations of a metal material distributed over an extent of the layer, whereby the metal material corresponds to the metal ions transferred during the charging and discharging process. For example, in this embodiment in which the battery cell 100 is a Li ion battery cell, the seed layer 120 includes discrete concentrations of Li metal in correspondence with the Li ions transferred within the battery cell 100. In some embodiments, the metal in the seed layer 120 exceeds an amount of metal that can migrate, as ions, across the separator 106 during the discharge process. In some embodiments, the metal in the seed layer 120 constitutes about 20% of the metal in the battery 100. In such embodiments, as a result, in a fully discharged state of the battery 100, about 20% by weight of a total amount of the metal material in the battery remains disposed within the seed layer In various embodiments, the concentrations of metal material in the seed layer 120 are in the form of clusters, nano-sheets, particles, or the like, or combinations thereof. A concentration of metal material acts as a nucleation target and attractant for metal ions arriving into the anode 104 from the separator 106. As a result, the seed layer 120 biases deposition of metal ions within the anode 104 toward the first interface 114 between the first current collector 102 and the anode 104. Thus, during the charging process, metal ion deposition tends to begin at the first interface 114 and grows toward the second interface 118 between the anode 104 and the separator 106.

Biasing metal ion deposition to start at the first interface 114 and grow toward the second interface 118 can inhibit the formation of dendrites. As noted above, dendrites may form at discontinuities or defects in the surface of a separator, and result in accelerating failure modes as the dendrite grows through the separator toward the cathode. In the battery cell 100, since metal ion deposition tends to start at the interface 114, metal ions are less likely to be deposited in a region of the second interface 118, and thus dendrites are less likely to form on the separator 106. Additionally, growing from the interface 114 toward the interface 118 means that metal ion deposition tends to occur at regions with a similar distance from the interface 114 until the material of the anode 104 at that distance are saturated with Li ions. This results in a more even distribution of metal ions over an extent of the anode 104, which can also inhibit the formation of dendrites by maintaining a more homogeneous current density.

Such biasing can also inhibit the growth of dendrites that form in spite of any inhibiting factors. Specifically, biasing metal ion deposition toward the first interface causes metal ions to tend to be deposited within the porous structure 116 of the anode 104 instead of on a surface of the anode 104 at the second interface 118. Such a dendrite is physically constrained by the porous structure 116 of the anode 104. In other words, a dendrite formed within the porous structure 116 can only grow until coming into contact with an internal surface bounding the internal void of the porous structure 116 in which it formed.

In some embodiments, the separator 106 is a solid state ion conductor. Any acceptable type of solid state ion conducting material is usable, including (i) polymer material such as a block-copolymer of polyethylene oxide (PEO) and styrene, polystyrene-b-poly(ethylene oxide) (SEO) doped with Li salt, or polymeric materials based on other backbone materials such as Poly(vinylidene fluoride) (PVDF), PEO, poly(methyl methacryate) (PMMA), or polyacrylonitrile (PAN), (ii) inorganic material, such as oxides, sulfides, or phosphates in ceramic or glassy form, or mixtures thereof, and (iii) combinations thereof. In various embodiments, the ceramic materials is crystalline, amorphous, or a mixture of the two. Other types of separators are used in other embodiments. In some embodiments, the separator 106 has a gel structure that includes a plasticizer and a liquid electrolyte such as alkyl carbonates, other solvents, or the like.

In some embodiments, the cathode 108 is a solid state cathode that includes cathode active material, an ion conducting phase, i.e. a catholyte, and an electronically conductive additive. Any acceptable cathode active material is usable. In some embodiments in which the battery cell 100 is a Li ion battery cell, the cathode active material is a correspondingly Li-based material such as a Li transition metal oxide in layered, spinel, or phosphate form, e.g. $LiFePO_4$, $LiNi_xCo_yAl_zO_2$. Any acceptable catholyte is usable. In some embodiments, the catholyte is a solid state material. In other embodiments, the catholyte is a liquid electrolyte material, a combination of liquid electrolyte material and a plasticizer, or a combination of liquid electrolyte and a solid electrolyte component. Any acceptable electronically conductive additive is usable, such as carbon black, graphite, graphene, and the like, or combination thereof. In some embodiments, the materials of the cathode active material, catholyte, and electronically conductive additive are selected so that the cathode 108 includes about 10% by weight of electrically conductive material, and about 30% by weight of ionically conductive material. In some embodiments, about 80% by weight of the cathode is formed by the cathode active material. In some embodiments, the cathode 108 has a thickness of about to 10 microns to about 150 micrometers or more.

Figure 2A:
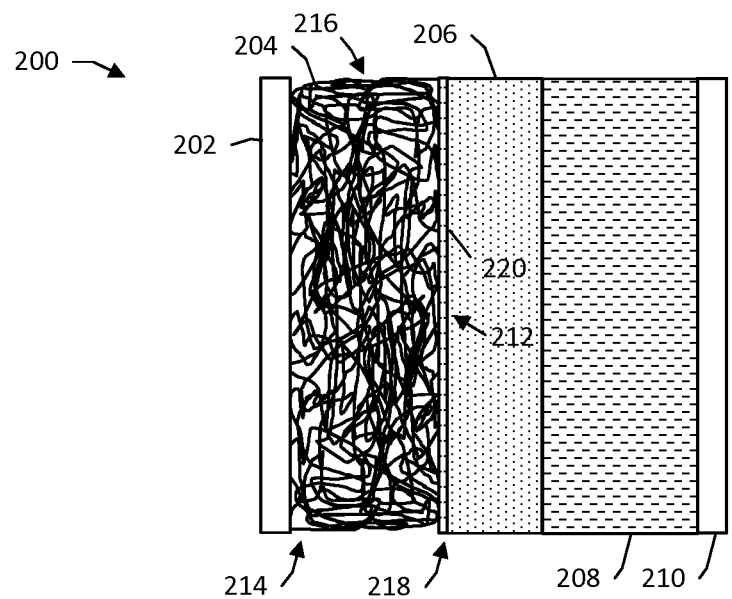
FIG. 2a depicts another exemplary embodiment of a battery cell according to this disclosure.

FIG. 2a depicts another exemplary embodiment of a metal-ion battery cell 200 according to this disclosure. In some embodiments, the battery cell 200 is a Li ion battery cell. The battery cell 200 includes a first current collector 202, an anode 204, a separator 206, a cathode 208, a second current collector 210, and a deposition biasing element 212. The separator 206 is positioned between the anode 204 and the cathode 208. The anode 204 is positioned between the first current collector 202 and the separator 206. The cathode 208 is positioned between the separator 206 and the second current collector 210.

In some embodiments, the deposition biasing element 212 is positioned in a region of a second interface 218 between the anode 204 and the separator 206. The deposition biasing element 212 in some embodiments includes a dendrite quenching layer 220. In some embodiments, the dendrite quenching layer 220 is formed by a dendrite quenching material coating that coats one or more of the anode 104 and the separator 106 over an extent of the second interface 118. In some embodiments, they dendrite quenching layer 220 is formed by dendrite quenching material dispersed within a portion of the porous structure 216 of the anode 204 proximate to the second interface 218.

Dendrite quenching material is material having a relatively high tendency to alloy with a metal material corresponding to the metal ions transferred within the battery cell 200. For example, in this embodiment in which the battery cell 200 is a Li ion battery cell, the dendrite quenching material is a material that tends to alloy with Li metal, such as Sn, Ge, Au, Al, Si In, and the like. The presence of dendrite quenching layer 220 in the region of the second interface 218 causes metal ions in the region of the second interface 218 to tend to alloy with the dendrite quenching material rather than being deposited within the anode 204. Thus, metal ion deposition is biased away from the region of the second interface 218.

Additionally, the alloying tendency of the dendrite quenching material enables the dendrite quenching layer 220 to trap dendrites that may have formed within the anode 204, and that might otherwise grow toward and into the separator 206. In other words, a dendrite formed within the anode 204 would cease growing when the dendrite comes into contact with and alloys with the dendrite quenching material of the dendrite quenching layer 220.

In some embodiments, the dendrite quenching layer 220 is configured to act as a dendrite growth indicator. During the charging process, metal ions will first tend to fill the porous structure 216, and thus metal ions will at first tend not to alloy with the dendrite quenching layer 220. However, as the porous structure 216 is filled and/or as dendrites grow toward the separator 206, more metal ions will tend to alloy with the dendrite quenching layer 220 instead of being deposited within the anode 204. A shift from a majority of transferred metal ions being deposited within the anode 204 to a majority of metal ions alloying with the dendrite quenching layer 220 causes a voltage fluctuation across the battery cell 200 that is indicative of one or more of a charge state of the battery cell 200 and dendrite formation within the battery cell 200. In some embodiments, such voltage fluctuations are about 100 mV or more.

Figure 2B:
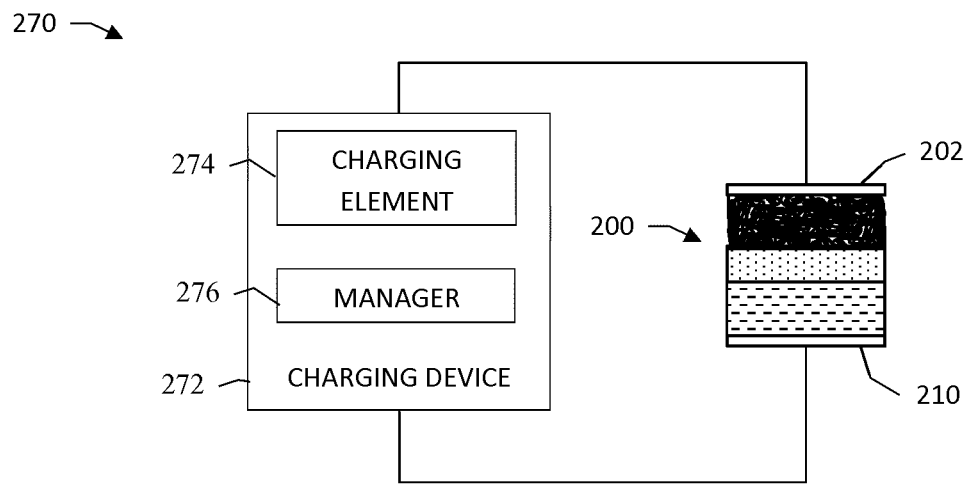

FIG. 2b depicts a charging system 270 for charging the battery cell 200. The first current collector 202 and second current collector 210 are connected to a charging device 272. The charging device 272 includes a charging element 274 configured to charge a battery cell connected to the charging device 272, and a charging manager 276. The charging manager 276 is configured to receive a signal indicative of a voltage across the first current collector 202 and second current collector 210. In response to a fluctuation in the voltage over a predetermined threshold, e.g. a fluctuation over 100 mV, the charging manager 276 is further configured to interrupt the charging of the battery cell 200 by the charging element 274. Using the voltage fluctuation as a trigger for stopping the charging process can prevent overcharge and/or further dendrite formation.

Figure 3:
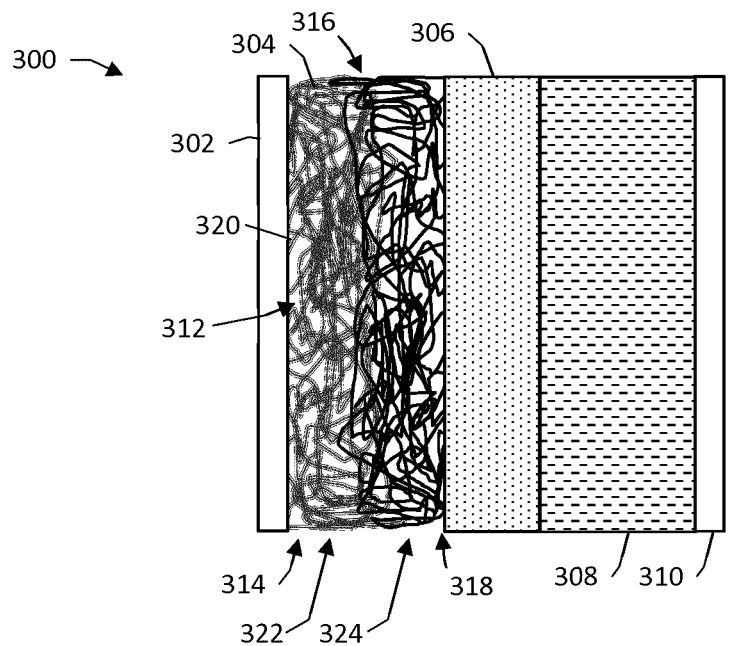
FIG. 3 depicts another exemplary embodiment of a battery cell according to this disclosure.

FIG. 3 depicts another exemplary embodiment of a metal-ion battery cell 300 according to this disclosure. The battery cell 300 includes a first current collector 302, an anode 304, a separator 306, a cathode 308, a second current collector 310, and a deposition biasing element 312. The separator 306 is positioned between the anode 304 and the cathode 308. The anode 304 is positioned between the first current collector 302 and the separator 306. The cathode 308 is positioned between the separator 306 and the second current collector 310.

In some embodiments, the deposition biasing element 312 includes an electronically conductive material coating 320 coated onto a first portion 322 of the porous structure 314 of the anode 304 proximate to the first collector 302.

A second portion 324 of the porous structure 314 is uncoated by the coating 322, and is purely ionically conductive, i.e. is not electronically conductive. As a result, metal ion deposition is biased away from the second portion 324 and toward the first portion 322. Any acceptable electronically conductive material is usable such as, for example, C, Si, or the like. In this embodiment, the coating 322 has a nanometer-scale thickness.

In some embodiments, the anode 104 is formed from purely ionically conductive material, and the purely ionically conductive second portion 324 results from the exposed purely ionically conductive material of the anode. In some embodiments, the second portion 324 of the anode 304 includes a further coating of an ionically conducting material.

In some embodiments, an entirety of the anode 104 is coated with the ionically conducting material, and the coating 320 for the first portion 322 is disposed on top of the ionically conductive material. In some such embodiments, a local impedance of the battery cell 300 is usable as a variable for managing a charging rate of the battery cell 300. An impedance of the anode 304 is a function of at least one of a filling fraction of metal ions in the anode 304 and a thickness of a portion of the anode 304 that is filled with metal ions. Thus, in some embodiments, a battery cell charger or battery manager is configured to adjust the charging rate for the battery cell 300 with reference to an impedance of one or more of the anode 304 and the battery cell 300 as a whole.

In some embodiments, the first portion 322 represents a majority portion of the anode 304, and the second portion 324 a minority portion. In various embodiments, the first portion 322 and second portion 324 represent different proportions of the anode 204. A higher proportion of the first portion 322 to the second portion 324 corresponds to higher dendrite control and a lower charging rate for the battery cell 300, while a lower proportion corresponds to lower dendrite control and a higher charging rate.

In some embodiments, the porous structure of anode is formed from a mesh of fibers produced via an electrospinning process. Electro spinning is a fiber production method which uses electric force to draw charged threads of materials, such as polymers, ceramics or polymer ceramic components, up to fiber diameters on the order of several hundred nanometers. A dispersion or solution of material is pumped or injected through a positively charged needle ejector, and is drawn out as fibers onto a negatively charged substrate.

In various embodiments, fibers are formed via electrospinning from ionically conductive material such as LIC material, polymer material, or combinations thereof. In some embodiments, material particles within the fibers have a uniform size. In some embodiments, material particles within the fibers have various sizes. A distribution of particle sizes within fibers enables a closer packing of the fibers, i.e. above a percolation threshold for the material(s) forming the fibers, which can increase a concentration of material for a given volume and improve inter-particle contact within the fibers.

As discussed in more detail below, in various embodiments an anode for a metal-ion battery is formed from electrospun fibers of ionically conductive ceramic material, from electrospun fibers of ionically conductive ceramic material and polymer material, from electrospun fibers of glassified ionically conductive material, from electrospun fibers of polymer material formed into a mesh and coated with an ionically conductive ceramic material coating. Such anodes have a low gravimetric density relative to conventional anodes, which enables a high energy density in a battery cell relative to conventional battery cells.

Figure 4:
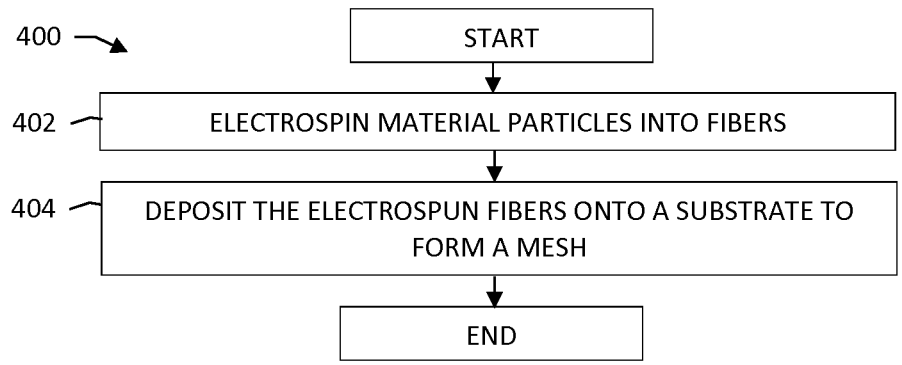
FIG. 4 depicts an exemplary method for forming an anode of a battery cell according to this disclosure.

FIG. 4 depicts an exemplary method 400 for forming an anode from electrospun fibers. At block 402 material particles are electrospun into fibers. The material particles include ionically conductive material. Any acceptable ionically conductive material is usable such as, for example LIC material. In some embodiments, the material particles additionally include particles of a polymer material blended with the particles of ionically conductive material. In some embodiments, the polymer material is an ionically conductive polymer such as an ionically conductive ceramic polymer. In some embodiments with ionically conductive polymer material particles, prior to the electrospinning, the polymer material particles are treated with a solvent imbibition process (not shown) in order to introduce salt.

At block 404, the electrospun fibers are deposited onto a substrate to form a mesh. In some embodiments, the substrate is a battery component, such as a current collector or a separator, and depositing the fibers includes a heating process in order to join the fibers to the substrate, as discussed in more detail below. In some embodiments, the substrate is configured to release the mesh in order to form a standalone anode.

Figure 5:
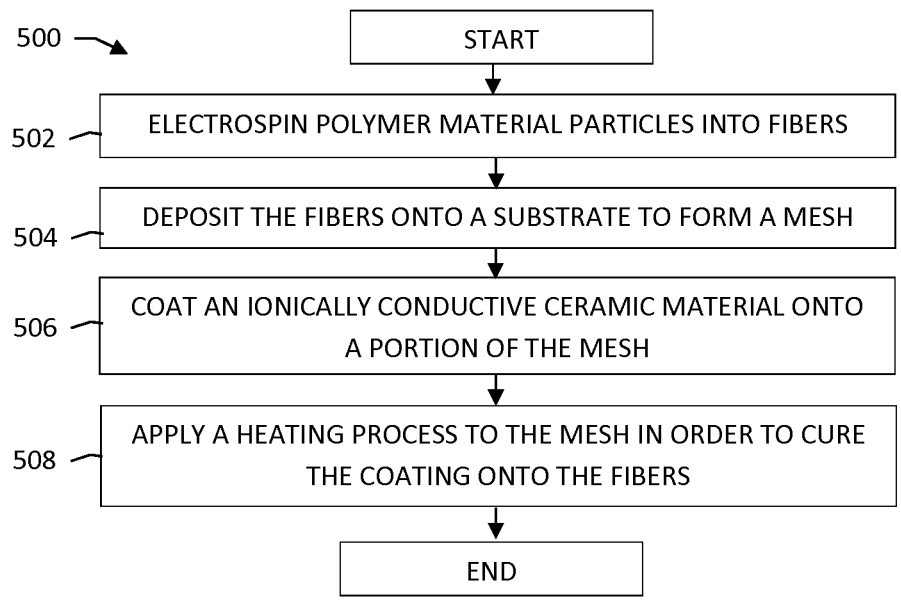
FIG. 5 depicts another exemplary method for forming an anode of a battery cell according to this disclosure.

FIG. 5 depicts an exemplary method 500 for forming an anode from electrospun fibers. At block 502 polymer material particles are electrospun into fibers, and at block 504, the fibers are deposited onto a substrate to form a mesh. At block 506, an ionically conductive ceramic material coating is coated onto a portion the fibers of the mesh. Any acceptable ionically conductive ceramic material is usable such as, for example, LIC material. Any acceptable coating process is usable. In some embodiments, the coating is applied via dip-coating the mesh into a melt of the ionically conductive ceramic material. In some embodiments, the mesh is treated with a solution that includes LIC material as a solute. In some embodiments, an entirety of the mesh is coated with the coating. In some embodiments, the coated portion is less than an entirety of the mesh. At block 508, a heating process is applied to the mesh in order to cure the coating onto the fibers.

Figure 6:
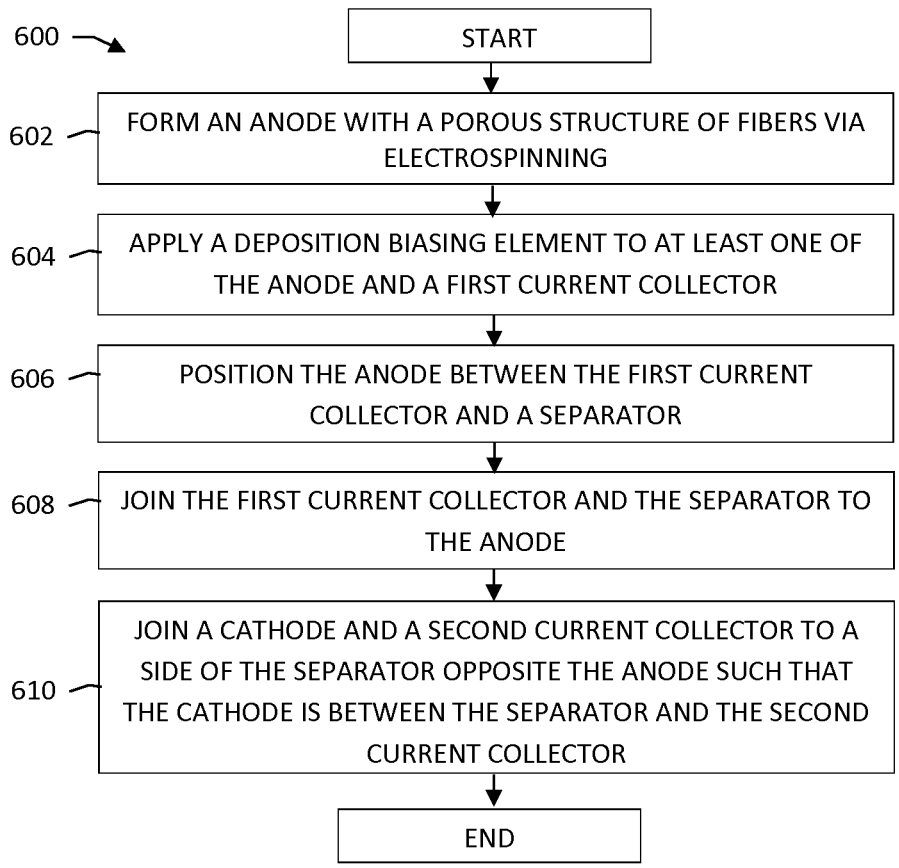
FIG. 6 depicts an exemplary method for forming a battery cell according to this disclosure.

FIG. 6 depicts an exemplary method 600 for forming a metal ion battery cell. At block 602, an anode with a porous structure of fibers is formed via an electrospinning process. At block 604, a deposition biasing element is applied to at least one of the anode and a first current collector. In some embodiments, a seed layer is applied to the first current collector. In some embodiments, a seed layer is applied to a first side of the anode. In some embodiments, a dendrite quenching layer is applied to a second side of the anode opposite the first side.

At block 606, the anode is positioned between the first current collector and a separator so that the first surface of the anode and the first current collector form a first interface, and the second surface of the anode and the separator form a second interface. In some embodiments, the electrospinning process at block 602 includes depositing the fibers directly onto the first current collector or the separator. In some embodiments, positioning the anode include releasing the anode from an electrospinning substrate. At block 608, the first current collector, anode, and separator are joined together. Any acceptable joining process is usable such as, for example, a local annealing process such as focused laser heating, or a low temperature sintering process. At block 610 a cathode and second current collector or an assembly including a cathode and a second current collector are joined to a side of the separator opposite the anode so that the cathode is between the separator and the second current collector to form a battery cell.

While several of the embodiments above pertained to Li ion and Li metal battery cells and components, it should be understood that the above-described features and techniques may be similarly applied to other metals and metal ions. Further, while several embodiments above pertain to an individual battery cell, it will be appreciated that multiple battery cells may be combined in series and/or in parallel into a battery.

It will be appreciated that variants of the above-described and other features and functions, or alternatives thereof, may be desirably combined into many other different systems, applications or methods. Various presently unforeseen or unanticipated alternatives, modifications, variations or improvements may be subsequently made by those skilled in the art that are also intended to be encompassed by the foregoing disclosure.

What is claimed is:

1. A battery cell, comprising:
a first current collector;
a separator;
an anode positioned between the first current collector and the separator, the anode including an ion conducting material with a porous structure; and
at least one deposition biasing element that is positioned within the battery cell so as to bias ion deposition within the anode, during a charging process for the battery cell, away from the separator, wherein the at least one deposition biasing element includes a seed layer having discrete concentrations of a metal material corresponding to ions conducted by the ion conducting material, the seed layer positioned between the first current collector and the separator so as to be closer to the first current collector than to the separator, and configured to bias ion deposition within the anode toward the first current collector.

2. The battery cell of claim 1, wherein the ion conducting material is a Li-based ceramic material.

3. The battery of claim 1, wherein the battery cell is configured such that, in a fully discharged state, 20% by weight of a total amount of the metal material corresponding to the ions conducted by the ion conducting material remains disposed within the seed layer.

4. The battery cell of claim 1, wherein the at least one deposition biasing element includes a dendrite quenching layer having a material configured to alloy with a metal material corresponding to ions conducted by the ion conducting material, the dendrite quenching layer positioned in a region of an interface between the anode and the separator and configured to bias ion deposition within the anode away from the separator.

5. The battery cell of claim 1, wherein the at least one deposition biasing element includes an electronically conductive coating coated onto a portion of the porous structure of the anode proximate to the first current collector, the electronically conducting coating configured to bias ion deposition within the anode toward the first current collector and away from the separator.

6. The battery cell of claim 1, wherein:
the anode includes a base formed by polymer material fibers; and
the ion conducting material is a coating coated onto the polymer material fibers to form the porous structure.

7. The battery cell of claim 1, wherein the anode has a porosity of 60% to 90%.

8. A method of forming a battery cell, comprising:
forming an anode that includes ionically conductive material via electrospinning particles of material into a mesh;
applying at least one deposition biasing element to at least one of the anode and a first current collector; and
positioning the anode between the first current collector and a separator so that the first current collector and a first side of the anode form a first interface, and so that a second side of the anode and the separator form a second interface; and
joining the first current collector and the separator to the anode, wherein applying the at least one deposition biasing element includes applying a seed layer between the first current collector and the separator so as to be closer to the first current collector than to the separator, the seed layer including discrete concentrations of a metal material corresponding to ions conducted by the ionically conductive material, and the seed layer configured to bias ion deposition within the anode, during a charging process, toward the first current collector.

9. The method of claim 8, wherein applying the at least one deposition biasing element includes applying a dendrite quenching layer to the second side of the anode, the dendrite quenching layer including a material configured to alloy with a metal material corresponding to ions conducted by the ion conducting material, and the dendrite quenching layer configured to bias ion deposition within the anode, during a charging process, away from the separator.

10. The method of claim 8 wherein applying the at least one deposition biasing element includes applying an electronically conductive material coating to a portion of the anode proximate to the first side, a remainder of the anode being purely ionically conductive such that ion deposition within the anode during a charging process is biased toward the first current collector and away from the separator.

11. The method of claim 8, further comprising:
joining a cathode and a second current collector to a side of the separator opposite the anode, such that the cathode is positioned between the separator and the second current collector.

12. The method of claim 11, wherein the anode, separator, and cathode are solid state, such that the battery cell is a solid state battery cell.

13. The method of claim 8, wherein the ionically conductive material is a Li-based ceramic material.

* * * * *